Dec. 12, 1967  N. G. ALEXAKIS  3,358,152
TEMPERATURE COMPENSATED TRANSISTOR AND MEANS FOR CONTROLLING
Filed July 22, 1963
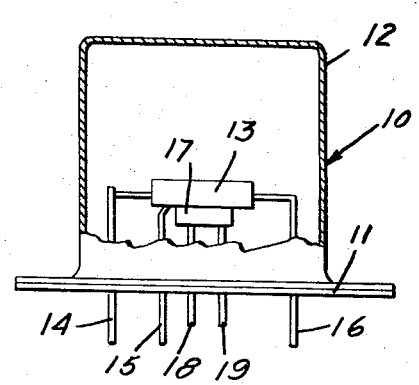
Fig. 1.
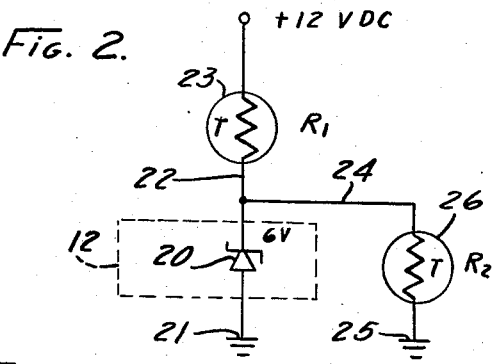
Fig. 2.
Fig. 3.
| Temp. | $R_1$ | $R_2$ | $R_1 + R_2$ | $R_{eq}$ | $E_{eq}$ | $I$ ma | $\Delta I / 10°C$ |
|---|---|---|---|---|---|---|---|
| -50°C | .0993K | 72 K | 72.1K | .099 K | 11.97 V | 60.3 ma | 4.7 ma |
| -40 | .108 | 42.8 | 42.91 | .1075 | 11.98 V | 55.6 | 4.5 |
| -30 | .117 | 29.25 | 29.37 | .1168 | 11.96 | 51.1 | 4.2 |
| -20 | .127 | 18.0 | 18.13 | .126 | 11.91 | 46.9 | 4.5 |
| -10 | .140 | 11.24 | 11.38 | .1385 | 11.87 | 42.4 | 3.62 |
| 0 | .152 | 7.65 | 7.30 | .149 | 11.78 | 38.78 | 2.68 |
| +10 | .161 | 4.95 | 5.11 | .156 | 11.62 | 36.1 | 2.88 |
| 20 | .171 | 3.375 | 3.55 | .1624 | 11.40 | 33.22 | 3.10 |
| 30 | .183 | 2.382 | 2.57 | .170 | 11.12 | 30.12 | 3.02 |
| 40 | .195 | 1.665 | 1.86 | .1748 | 10.74 | 27.1 | 2.17 |
| 50 | .206 | 1.17 | 1.38 | .1748 | 10.18 | 24.93 | 4.33 |
| 60 | .219 | .855 | 1.07 | .175 | 9.59 | 20.6 | 4.37 |
| 70 | .230 | .608 | .838 | .167 | 8.71 | 16.23 | 4.45 |
| 80 | .245 | .473 | .718 | .1615 | 7.90 | 11.78 | 5.52 |
| 90 | .257 | .351 | .608 | .1485 | 6.93 | 6.26 | 6.26 ma |
| +100°C | .270 K | .270K | .540K | .135 K | 6.0 V | 0 ma | |
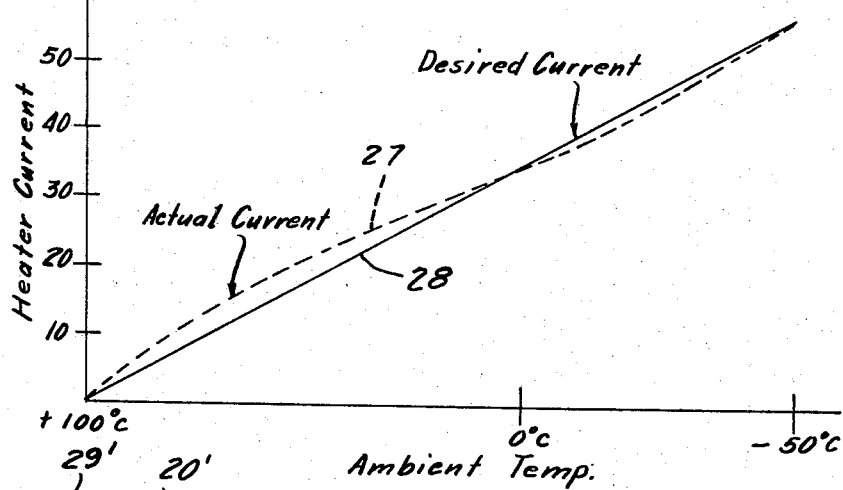
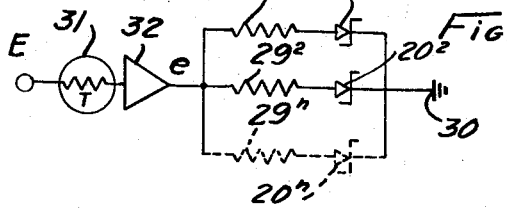
Fig. 5.
INVENTOR.
Nicholas G. Alexakis
BY
Robert M. McManigal
Attorney United States Patent Office 3,358,152
Patented Dec. 12, 1967

3,358,152
TEMPERATURE COMPENSATED TRANSISTOR
AND MEANS FOR CONTROLLING
Nicholas G. Alexakis, 320 S. Cummings St.,
Los Angeles, Calif. 90033
Filed July 22, 1963, Ser. No. 296,586
8 Claims. (Cl. 307—88.5)

The present invention relates generally to semiconductor devices, and is more particularly concerned with improvements in transistors and means for controlling and regulating their operating temperature.

Conventional present day transistors are inherently temperature sensitive and display wide variations in certain of their operating parameters in response to changes of ambient temperature. Certain of these variable parameters may be noted, as follows:

(a) Current gain ($\beta$).—Gain decreases as the ambient temperature is decreased, and increases as the temperature is increased.

(b) Base-emitter forward voltage ($V_{BE}$).—This parameter decreases approximately 2 millivolts per degree centigrade temperature change.

(c) Base-collector leakage ($I_{CBO}$).—This parameter is highly temperature dependent and increases with increase of temperature.

(d) Other parameters.—$V_{EBO}$, $V_{CE}$ SAT., collector-emitter breakdown voltage, etc., comprise other transistor parameters which are likewise temperature responsive.

The above noted variable parameter characteristics are inherent in transistors of both the germanium type and silicon type.

The above noted variations in operating parameters due to changes in ambient temperature create problems and design difficulties which must be taken into account in the design of circuits in various types of equipment. Heretofore it was necessary to use large amounts of feedback, add additional components, utilize compensation networks, and selectively choose the proper transistors. Temperature difficulties are particularly critical, for example, in direct current amplifiers, alternating current amplifiers, voltage regulators, power supply references, precision or semi-precision analog circuits, and digital circuitry operating over wide temperature ranges.

In addition to special circuit design, component selection and matching, other expedients have been used to stabilize the transistor operations under variable temperature conditions. Notably, temperature stabilized ovens may be utilized to house critical circuitry and thus assure constant operating temperature. However, the use of ovens has the disadvantage that space requirements are increased, and larger amounts of power are required. The use of ovens also necessitates the use of long lead lengths which result in added capacity and mechanical problems.

Having in mind the above noted existing problems and the difficulty of correcting the operating conditions by the heretofore utilized conventional arrangements, it is one object of the present invention to provide simple and economical means for temperature compensation of a transistor.

A further object of the herein described invention is to provide simple and effective means for variably controlling the operating temperature of a transistor in response to changes in embient temperature.

Another object is to provide, as an article of manufacture, an improved combination of a transistor and heater means as a unitary device.

Still another object is to provide an improved method for controlling the operating temperature of semiconductor devices, in accordance with the concepts of the present invention.

Briefly, the above objects are accomplished in the herein described invention by means of a new transistor arrangement which will be effective to reduce parameter changes by an approximate factor of 10, and wherein the power requirements are small. This is accomplished by providing electrically energized heating means which are installed in intimate thermal conductive relationship with a transistor chip, and the utilization of heater control means operable in response to changes in ambient temperature to vary the energization of the heater in such a manner that it will have substantially linear operating characteristics. By utilization of the herein described invention, a transistor having an ambient temperature range of, for example, −50° C. to +100° C. will be subjected to a 10° C. change rather than a 150° C. change.

Further objects of the invention will be brought out in the following part of the specification, wherein detailed description is for the purpose of fully disclosing the invention without placing limitations thereon.

Referring to the accompanying drawings, which are for illustrative purposes only:

FIG. 1 is an elevational view of a transistor constructed according to the present invention, a portion of the transistor case being broken away to show the cooperative relationship therein between the transistor chip and associated heater means;

FIG. 2 is a view schematically showing the circuit connections of the control for the heater means;

FIG. 3 is a tabulation of measured and calculated values obtained in an exemplary heater and control arrangement according to the present invention;

FIG. 4 is a graph plotted from the tabulated data of FIG. 3, and showing the substantially linear current characteristics obtained with the control means for energizing the heater; and FIG. 5 is a schematic diagram showing a modified control arrangement for a plurality of temperature compensated transistors.

Referring more specifically to the drawings, for illustrative purposes, there is shown in FIG. 1 a transistor device as generally indicated by the numeral 10, and which embodies the features of the herein described invention. More specifically, this transistor device comprises a base 11 upon which there is mounted a cap-like cover casing 12. Mounted in conventional manner within the casing is a transistor element 13, electrical connections to the transistor being accomplished by connection terminals, namely an Emitter terminal 14, Base terminal 15 and Collector terminal 16. The construction thus far described is conventional. According to the concepts of the present invention, the transistor chip assembly has been modified by the inclusion of a heating element 17 which is provided with connection terminals 18 and 19. The transistor and heating element terminals project to the exterior of the casing and enable the connection of these elements independently into control circuits.

The heating element is mounted in intimate heat conductive relation to the transistor chip or wafer by being bonded or otherwise connected thereto in good thermal contact, but so as to be electrically isolated therefrom. With such an arrangement it will be evident that by properly varying the energizing current through the heating element, it will be possible to control and regulate the temperature of the semi-conductive chip or wafer to a substantially constant value and thus oppose and stabilize the parameters of the transistor against changes due to changes in ambient temperature.

By utilizing an intimately associated heating element for the transistor, the amount of power required is relatively small, especially in the case of signal type transistors and require very small space as compared to ovens requiring larger space requirements and greater power.

A heating element of the resistance type may be utilized. However, since it is proposed in the present invention to vary the energy dissipation of the heater element as a function of changes in ambient temperature, a somewhat complicated control would be necessitated for the reason that the power dissipation in a resistance type heater element varies as the square of the energizing current. It will be obvious that the control may be greatly simplified by the utilization of a heater element having a linear characteristic. For such purpose, in the present invention, a zener diode has been utilized as the heater element, and has the advantage of utilizing low potential of the order of 6 volts for its energization. Energizing current through the zener diode will be controlled in response to changes in ambient temperature outside the transistor casing, as will hereinafter be described, the control being so arranged that as the ambient temperature decreases, current through the zener diode will increase so as to maintain the temperature of the transistor wafer at a substantially constant value.

In the majority of cases, it will be desirable to arrange the control circuitry so as to obtain zero current through the zener diode at the highest ambient operating temperature of the transistor. However, in some cases it may be desired to start the operation of the zener diode only when the ambient temperature falls below a certain point.

In considering the current requirements, when utilizing the zener diode as the heating element, it will be appreciated that the amount of current required for a given decrease in ambient temperature will be dependent upon the characteristics of the particular transistor under consideration. Power transistors will require more current and signal type transistors relatively less current. The determining factor is the "dissipation per degree centigrade rise" of the particular transistor.

In the present invention, it is proposed to provide current control which will vary the zener compensating current linearly and so that the zener current will be substantially zero at the highest expected ambient temperature, and wherein the zener current will be a maximum at the lowest expected ambient temperature.

The above requirements thus conform to the following relationship:

Zener dissipation=(zener voltage) (zener current)

$P_z = E_z I = f(I)$ $\frac{dPZ}{dI} = $ a constant

From the above it will be clear that for a given zener diode and a given transistor type, the current requirements can be specified in terms of ma./° C.

Referring to FIG. 2, there is shown a control arrangement for obtaining linear variation of the energizing current of the zener diode in response to changes of ambient temperature in order to obtain the objectives of the present invention. For such purpose, the control is disclosed as being utilized in connection with a 6.1 volt zener diode 20 within the transistor casing 12 as indicated in phantom lines, the diode having one electrode grounded at 21 and its other electrode connected through a conductor 22 to the positive side of a D.C. potential source, in this case being disclosed as 12 volts. A temperature responsive resistor $R_1$ as indicated by the numeral 23 is connected in the conductor 22 so as to be in series relation with the diode 20. A branch conductor 24 connects the junction of the diode and resistor 23 to a ground point as indicated at 25, the conductor 24 containing a temperature responsive resistor $R_2$ as indicated by the numeral 26 and which is thus in parallel relation with respect to the diode 20. The resistors $R_1$ and $R_2$ are commonly referred to as "thermistors." The resistor $R_1$ has a positive temperature coefficient, while the resistor $R_2$ had a negative temperature coefficient. An extremely simple control is thus provided which embodies only two components for each transistor, this control being devoid of switching transients and other complex control arrangements which are required for the control of conventional ovens.

The resistors $R_1$ and $R_2$ constitute the ambient temperature sensing elements of the control and may be packaged as a unit occupying a relatively small space. There are two possible sensing locations which may be utilized for the resistors. The first of these may be termed Ambient Sensing, and the second may be termed Heat Sink Sensing.

In ambient sensing, the resistors would be located in the vicinity of, but isolated from, the associated transistor chip. The disadvantage in this case is that the resistors do not compensate for any possible changes in transistor dissipation. Transistors may dissipate more or less power depending on signal conditions and operating point. This disadvantage, however, is of minor importance in most signal applications.

In heat sink sensing, the temperature sensitive resistors would be mounted on the transistor heat sink. Any changes in transistor dissipation would thus be corrected for, since a change in dissipation would in this case be interpreted by the circuit as a change in ambient temperature, and the current through the zener diode altered accordingly. This method would be particularly useful in the case of power transistor applications.

By properly choosing the values of the resistors $R_1$ and $R_2$, the energizing current of the zener diode forming the heating element may be controlled linearly in response to changes in ambient temperature. This will be readily apparent from a consideration of the equivalent circuit for the control arrangement as shown in FIG. 2, in which:

$$E_{eq} = \frac{12(R_2)}{R_1 + R_2}$$

$$R_{eq} = \frac{R_1 R_2}{R_1 + R_2}$$

taking I as the current through the diode, then:

$$I = \frac{E_{eq} - 6}{R_{eq}}$$

$$I = \frac{\frac{12 R_2}{R_1 + R_2} - 6}{\frac{R_1 R_2}{R_1 + R_2}} = \frac{6R_2 - 6R_1}{R_1 R_2} = \frac{6}{R_1} - \frac{6}{R_2}$$

First design criteria:

I must equal zero at the highest expected ambient temperature.

∴ $R_1 = R_2$ at such temperature.

Second design criteria:

$$\frac{dI}{dT} = A$$

where:

T = temperature and
A = a constant

The value of A is expressed in ma./° C. and its magnitude is determined by the heat loss characteristics of the particular transistor.

As exemplary of the operation of the present invention, utilizing the control arrangement shown in FIG. 2, commercially available resistors $R_1$ and $R_2$ were utilized, and the measured values obtained as tabulated in FIG. 3 to cover ambient temperature control between $+100°$ C. and $-50°$ C. range.

The results are best shown by the graph in FIG. 4 wherein ambient temperature is plotted against heater current. The actual current is shown by the dash line while the desired purely linear desired current is shown by the full line 28. Thus, it will be apparent that the actual current is substantially linear and that the proposed control provides the desired effect for the successful operation of the invention as disclosed herein. The ambient range of $150°$ C. has thus been reduced by a factor of 12 or more, in this particular design. Improvement factors of the order of twenty would be possible with more particular selection of the resistors.

Referring now to FIG. 5, a modified control arrangement is disclosed where it is desired to use a single driver to control a plurality of temperature compensated transistors. In this arrangement, the zener diodes $20^1$–$20^2$–$20^n$ are respectively connected through selected dropping resistors $29^1$–$29^2$–$29^n$ into parallel circuits between the voltage $e$ and ground 30. In the disclosed arrangement, the main voltage source E is connected through a temperature sensitive resistor 31 and a power amplifier 32. With this arrangement, the output voltage $e$ would be so arranged that at the highest expected ambient temperature, this output voltage would be equal to the rated zener diode voltage e.g. 6 volts. The values of the dropping resistors would respectively be determined by the thermal characteristics of the associated transistor element in each case.

Various modifications may suggest themselves to those skilled in the art without departing from the spirit of my invention, and, hence, I do not wish to be restricted to the specific forms shown or uses mentioned, except to the extent indicated in the appended claims.

I claim:
1. Means for stabilizing the operating temperature of a semi-conductor chip comprising in combination:
   (a) electrically energizable heat generating means mounted in intimate heat conductive relation with the chip for heating the chip;
   (b) circuit means adapted to connect an electrical source to said heat generating means; and
   (c) control means including temperature sensitive means connected to said circuit means and adapted to respond to changes in ambient temperature for continuously controlling the provision of energizing current flow through said heat generating means inversely with respect to ambient temperature changes, said temperature sensitive means including an interconnected positive temperature coefficient resistor means and negative temperature coefficient resistor means, said resistor means being so proportioned as to vary energizing current flow through said heat generating means so that the heat generated will have an essentially linear characteristic with respect to the applied energizing current.

2. Means for stabilizing the operating temperature of a semi-conductor chip, comprising in combination: electrically energizable heat generating means mounted in intimate heat conductive relation with the chip for heating the chip to a predetermined temperature, said heat generating means comprising a zener diode; circuit means adapted to connect an electrical source to said heat generating means; and control means including temperature sensitive means connected to said circuit means and adapted to respond to changes in ambient temperature for controlling the provision of energizing current flow continuously through said heat generating means inversely with respect to ambient temperature changes, said temperature sensitive means including an interconnected positive temperature coefficient resistive means and negative temperature coefficient resistive means, said zener diode being connected in series with the positive temperature coefficient resistive means and in parallel with the negative temperature coefficient resistive means, so that current flow through said diode decreases substantially to zero at a predetermined high ambient temperature condition said resistive means being so proportioned as to vary energizing current flow through said zener diode so that the heat generated will have an essentially linear characteristic with respect to the applied energizing current.

3. Means for stabilizing the operating temperatures of a plurality of transistor chips in accordance with changes in a common ambient temperature, comprising:
   (a) zener diodes respectively mounted in intimate heat conductive relation with the transistor chips;
   (b) means adapted to connect an electrical source to supply a delivery potential;
   (c) means connecting each of said diodes and a series connected dropping resistor in parallel flow circuits across said delivery potential; and
   (d) means for varying said delivery potential in response to changes in a sensed ambient temperature so that the potential will have a maximum value at the low temperature operating limit and a predetermined minimum potential value at a predetermined high temperature operating limit.

4. Means for stabilizing the parameters of a transistor against drift and variation due to changes in the operating temperature of the transistor chip comprising:
   (a) electrically energizable heat generating means electrically insulated from but in direct thermally conductive contact with the body of the chip for applying heat directly to the chip;
   (b) energizing means adapted to be connected to a source of electrical energy for providing a continuous flow of electrical energy to said heat generating means; and
   (c) temperature sensing means coupled to said energizing means and adapted to detect variations in temperature, for maintaining the chip at a substantially constant predetermined temperature, by controlling said energizing means to regulate the continuous flow of electrical energy to said heat generating means.

5. Apparatus as in claim 4, above, wherein said energizing means include an amplifier coupled to receive the output of said temperature sensing means.

6. Means for stabilizing the temperature dependant parameters of a semi-conductor chip comprising:
   (a) electrically energizable heat generating means electrically insulated from but in direct thermally conductive contact with the body of the chip for applying heat directly to the chip;
   (b) temperature sensitive energizing means, adapted to be connected to a source of electrical energy for providing a continuous flow of electrical energy to said heat generating means for maintaining the temperature of the chip at a substantially constant predetermined temperature, by regulating the continuous flow of electrical energy in response to variations in temperature.

7. Apparatus as in claim 6, above, wherein said temperature sensitive energizing means include temperature sensing means mounted adjacent the semi-conductor chip for detecting variations in the temperature in the vicinity of the semi-conductor chip to control the flow of electrical energy.

8. Apparatus as in claim 6, above, wherein the chip further includes a heat sink member upon which the chip is mounted, and wherein said temperature sensitive, energizing means include temperature sensing means adapted to detect variations in the temperature of the heat sink.

(References on following page)

References Cited

UNITED STATES PATENTS

| | | | |
|---|---|---|---|
| 2,932,714 | 4/1960 | Merill | 307—88.5 X |
| 2,938,130 | 5/1960 | Noll | 307—88.5 |
| 2,952,786 | 8/1960 | Lewis | 310—8.9 |
| 3,024,299 | 3/1962 | Nijhuis et al. | 317—234 X |
| 3,028,473 | 4/1962 | Dyer et al. | |
| 3,079,484 | 2/1963 | Schockley et al. | 219—501 |
| 3,113,255 | 12/1963 | Eberts | 307—88.5 |
| 3,182,201 | 5/1965 | Sklar | 307—88.5 |
| 3,244,949 | 4/1966 | Hilbiber | 317—235 |

JOHN S. HEYMAN, *Primary Examiner.*

J. A. JORDAN, *Assistant Examiner.*

Notice of Adverse Decisions in Interferences

In Interference No. 97,126 involving Patent No. 3,358,152, N. G. Alexakis, TEMPERATURE COMPENSATED TRANSISTOR AND MEANS FOR CONTROLLING, final judgment adverse to the patentee was rendered Mar. 9, 1973, as to claims 4, 5 and 6.

[*Official Gazette September 4, 1973.*]